(12) United States Patent
Kersch et al.

(10) Patent No.: US 10,939,328 B2
(45) Date of Patent: Mar. 2, 2021

(54) TIMETABLES FOR PUBLIC TRANSPORT LINES FROM MOBILE NETWORK HANDOVERS

(71) Applicant: Telefonaktiebolaget LM Ericsson (publ), Stockholm (SE)

(72) Inventors: Péter Kersch, Budapest (HU); Eszter Bencsne Bokanyi, Budapest (HU); Péter Bognár, Sopron (HU); Attila Korösi, Budapest (HU); László Toka, Budapest (HU); Tamas Zambo, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/652,185

(22) PCT Filed: Aug. 16, 2018

(86) PCT No.: PCT/IB2018/056159
§ 371 (c)(1),
(2) Date: Mar. 30, 2020

(87) PCT Pub. No.: WO2019/073311
PCT Pub. Date: Apr. 18, 2019

(65) Prior Publication Data
US 2020/0305030 A1    Sep. 24, 2020

Related U.S. Application Data

(60) Provisional application No. 62/570,231, filed on Oct. 10, 2017.

(51) Int. Cl.
H04W 8/02    (2009.01)
H04W 36/00    (2009.01)
G08G 1/127    (2006.01)

(52) U.S. Cl.
CPC ........ *H04W 36/0009* (2018.08); *G08G 1/127* (2013.01); *H04W 36/0083* (2013.01)

(58) Field of Classification Search
None
See application file for complete search history.

(56) References Cited

U.S. PATENT DOCUMENTS

| 8,838,134 B2 | 9/2014 | Martinez et al. |
| 2010/0197325 A1 | 8/2010 | Dredge |

(Continued)

FOREIGN PATENT DOCUMENTS

| EP | 2608179 A1 | 6/2013 |
| EP | 2608181 A1 | 6/2013 |

(Continued)

OTHER PUBLICATIONS

Albrecht, T. et al., "A Precise and Reliable Train Positioning System and its Use for Automation of Train Operation", 2013 IEEE International Conference on Intelligent Rail Transportation Proceedings, Aug. 30, 2013, pp. 1-6, IEEE.

(Continued)

*Primary Examiner* — Gary Lafontant
(74) *Attorney, Agent, or Firm* — Coats & Bennett, PLLC

(57) ABSTRACT

Handover bursts are identified for source and target cell pairs along a given public transport line, and each of the handover bursts are tagged with anonymized identifiers of participating users. By searching for handover bursts with a significant share of common user identifiers, it is possible to recursively connect bursts corresponding to a particular public transport vehicle trip. Further, by projecting the estimated location of all connected handover bursts to the path of the given public transport line, it is possible to interpolate stop times and locations for the given vehicle along the entire trip.

18 Claims, 10 Drawing Sheets

(56) References Cited

U.S. PATENT DOCUMENTS

| | | |
|---|---|---|
| 2013/0183927 A1* | 7/2013 | Scarr .................... H04W 4/029 455/405 |
| 2015/0176997 A1 | 6/2015 | Pursche et al. |
| 2015/0271727 A1 | 9/2015 | Harrang |
| 2016/0078762 A1 | 3/2016 | Jouaux et al. |

FOREIGN PATENT DOCUMENTS

| | | |
|---|---|---|
| EP | 3031043 B1 | 8/2017 |
| WO | 2018157955 A1 | 9/2018 |

OTHER PUBLICATIONS

Goggle Developers, "Google Transit APIs", Aug. 26, 2016, pp. 1-3, retrieved on Sep. 12, 2017, retrieved from internet: https://developers.google.com/transit/gtfs-realtime/.

Lortaisong, A. et al., "Handover Position Estimation on Cellular Probe Data for a Novel Positioning Scheme", 2012 8th International Conference on Computing and Networking Technology (INC, ICCIS and ICMIC), Aug. 27, 2012, pp. 380-384, IEEE.

Zhou, P. et al., "How Long to Wait? Predicting Bus Arrival Time With Mobile Phone Based Participatory Sensing", IEEE Transactions on Mobile Computing, vol. 13 No. 6, Jun. 1, 2014, pp. 1228-1241, IEEE.

Di Lorenzo, G. et al., "AllAboard: Visual Exploration of Cellphone Mobility Data to Optimise Public Transport", IEEE Transactions on Visualization and Computer Graphics, vol. 22 No. 2, Feb. 1, 2016, pp. 1036-1050, IEEE.

Google Developers, "GTFS Realtime Overview", Jul. 3, 2019, pp. 1-4, retrieved on Jul. 16, 2019, retrieved from internet: https://developers.google.com/transit/gtfs-realtime/.

REACH-U, "Urban Planning Application", pp. 1-2, retrieved on Jul. 16, 2019, retrieved from internet: https://www.reach-u.com/urban-planning-application.html.

Eland, A., "Tackling Urban Mobility with Technology", Google Europe Blog, Nov. 18, 2015, pp. 1-4, retrieved on Jul. 16, 2019, retrieved from: https://europe.googleblog.com/2015/11/tackling-urban-mobility-with-technology.html.

Poonawala, H. et al., "Singapore in Motion: Insights on Public Transport Service Level Through Farecard and Mobile Data Analytics", 22nd ACM SIGKDD Conference on Knowledge Discovery and Data Mining, Aug. 13, 2016, pp. 1-10, ACM.

* cited by examiner

TIMETABLES FOR PUBLIC TRANSPORT LINES FROM MOBILE NETWORK HANDOVERS

This application claims priority to Provisional U.S. Patent Application No. 62/570,231 filed 10 Oct. 2017, the disclosure of which is incorporated herein by reference in its entirety.

TECHNICAL FIELD

The solution presented herein generally relates to public transport schedule information, and more particularly relates to providing live scheduling information for vehicles traveling along public transport lines using correlations of movement of the vehicle along the line with handover bursts associated with passengers on the vehicle.

BACKGROUND

As cities continue to pursue modernization of public transportation systems, the availability of live public transport schedule information to denizens has become increasingly important for the success of any smart-city solution. Industry standard Application Program Interfaces (APIs) are available to expose such live schedule information, such as the General Transit Feed Specification (GTFS) Realtime specification as described in https://developers.google.com/transit/qtfs-realtime/. Further, there are also vendors delivering systems to provide such information by equipping vehicles with Global Positioning System (GPS) modules that periodically transmit location and status information to the traffic control system. For vehicles on rails (also called rolling stock when transporting goods) there are traditionally fixed installations along the track that provide positioning information.

However, there are many real world cases when specific lines are not integrated into these live public transport control systems, often due to budget reasons. For example, underground metro and train lines would require special vehicle tracking technology due to the unavailability of GPS signal in tunnels. While such special tracking technology is technically feasible, it is often too expensive to integrate. As such, high system integration cost is often a blocking point. For example in Budapest, metro lines and suburban railways (some of which have a short underground segment) had not yet been integrated into the live vehicle information system of the public transport company due to the high integration cost with special underground vehicle tracking systems. Also, for some above-ground tram lines, integration was delayed by many years due to system integration (SI) difficulties with the on-board electronics system of some vehicles.

SUMMARY

Certain aspects of the present disclosure and their embodiments may provide solutions to these or other challenges. The proposed solution makes use of existing cellular infrastructure already available in every city of the world. Mobile phones of passengers traveling on the same vehicle are performing handovers between cells of the mobile network at roughly the same times. For busy lines with many passengers on the same vehicle, such handovers result in heavy peaks in handover intensities that strongly correlate with the movement of the vehicle.

The solution presented herein identifies handover bursts for source and target cell pairs along a given public transport line, and tags each of them with anonymized identifiers of participating users. By searching for handover bursts with a significant share of common user identifiers, it is possible to recursively connect bursts corresponding to a particular public transport vehicle trip. Finally, projecting the estimated location of all connected handover bursts to the path of the given public transport line, it is possible to interpolate stop times and locations for the given vehicle along the entire trip.

In one exemplary embodiment, a method comprises obtaining cell handover information for multiple subscriber telecommunications devices of one or more network or service providers, and generating schedule information for one or more vehicles and/or vehicle routes based on the obtained cell handover information.

In one exemplary embodiment, a device comprises processing circuitry and memory. The memory contains instructions executable by the processing circuitry, causing the processing circuitry to obtain cell handover information for multiple subscriber telecommunications devices of one or more network or service providers, and generate schedule information for one or more vehicles and/or vehicle routes based on the obtained cell handover information.

One exemplary embodiment comprises a computer program product for controlling a device to determine scheduling information for vehicles and/or vehicle routes. The computer program product comprises software instructions which, when run on at least one processing circuit in the device, causes the processing circuit to obtain cell handover information for multiple subscriber telecommunications devices of one or more network or service providers, and generate schedule information for one or more vehicles and/or vehicle routes based on the obtained cell handover information.

One exemplary embodiment comprises a device configured to determined scheduling information for vehicles and/or vehicle routes. The device comprises an obtaining circuit and a generating circuit. The obtaining circuit is configured to obtain cell handover information for multiple subscriber telecommunications devices of one or more network or service providers. The generating circuit is configured to generate schedule information for one or more vehicles and/or vehicle routes based on the obtained cell handover information.

Certain embodiments may provide one or more of the following technical advantages. For example, the proposed solution can be a cheap replacement of costly and/or time consuming system integration between vehicle on-board electronics, vehicle tracking systems, and traffic control systems. Mobile network infrastructures are already available in all cities of the world, and unlike diverse traffic control and on-board vehicle electronic systems, cellular infrastructures are built using the same 3GPP standards almost everywhere in the world. Furthermore, in the solution presented herein, only mobile network cell and public transport line parameters have to be specified, in a well-defined format, as configuration parameters, which is cheaper and faster than integrating diverse IT systems.

DETAILED DESCRIPTION

The present disclosure describes techniques for generating schedule and status information for one or more vehicles (e.g., trains, busses, subways, etc.) in semi-real time. To do so, a system device (or devices working together and in communication) gathers or otherwise obtains information regarding mobile subscriber device handover bursts from mobile networks, and leverages this information to approximate schedule and status information for the vehicle(s), e.g., vehicle locations, stop and arrival times, and schedule information.

Figure 1:
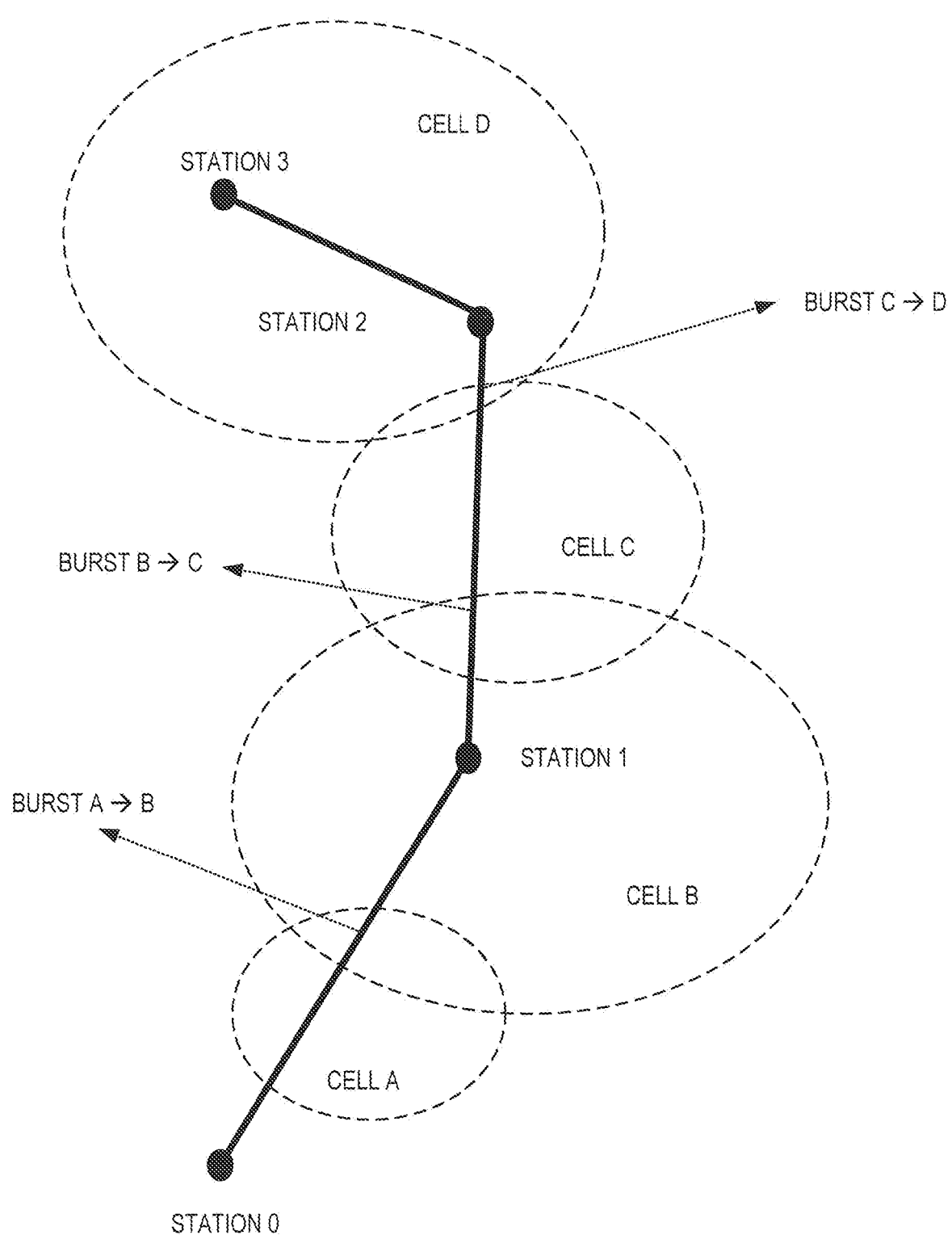
FIG. 1 shows exemplary wireless communication cells overlapping with a vehicle route.

With this in mind, FIG. 1 illustrates an exemplary group of cells (A, B, C, and D) whose coverage area at least partially overlaps with a vehicle route (dark line) that contains several stops (e.g., stations 0-3). If a vehicle carrying a group of mobile subscriber devices was to start a route from station 0 to station 3, stopping at station 1 and station 2 on its way to station 3, the vehicle would cross three separate likely handover areas. Namely, those mobile subscribers who have access to the cells of FIG. 1 would likely undergo handover from cell A to cell B at approximately the point where the cell coverage overlaps, thus creating a handover "burst" whereby a relatively large proportion of on-board mobile subscriber devices would be handed over from source cell A to target cell B during a short period of time. This process may repeat itself at the overlapping of cell B and cell C, and again at the overlapping of cell C and cell D, as the vehicle moves through the overlapping region of cells B, C, and D while traversing the route between station 0 and station 3.

The mobile networks may be configured to output handover events for each individual handover between cells along these lines to a device in a schedule calculator system such that the system can analyse the data and determine bursts, and along with other, previous burst data and potentially subsequent burst data, to generate real-world schedule information for the vehicle, the route, and/or the system as a whole. The general technique for generating such schedule information will be explained in greater detail below in reference to the remaining figures.

Figure 2:
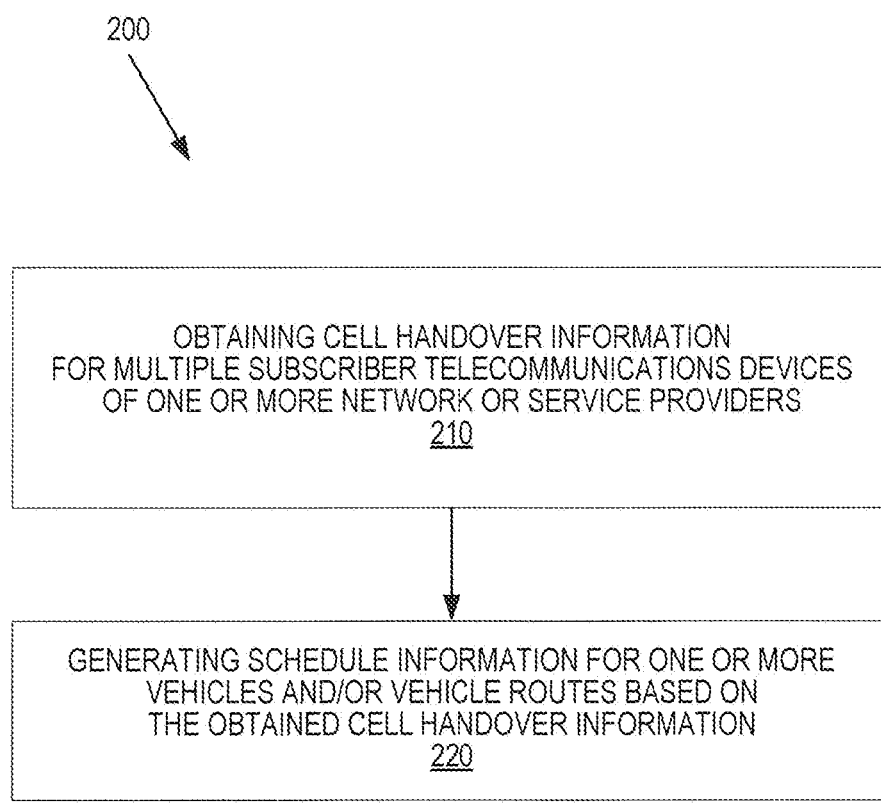
FIG. 2 shows a method of generating schedule information for one or more vehicles according to one exemplary embodiment.

FIG. 2 depicts a method 200 of generating schedule information for one or more vehicles in accordance with particular embodiments. The method includes a device obtaining cell handover information for multiple subscriber telecommunications devices of one or more network or service providers (Block 210). In one exemplary embodiment, this cell handover information may include handover burst information relating to mobile subscriber telecommunication devices. The method further includes a device generating schedule information for one or more vehicles and/or vehicle routes based on the obtained cell handover information (Block 220). In an exemplary embodiment, the method of FIG. 2 may be implemented by a schedule system 300 (which may comprise one or more devices (including device 700 of FIGS. 9 and 10, below), software modules, processing units, or the like) for a transportation network or system, e.g., a public subway, bus, bike, or other vehicle system. It will be appreciated, however, that the solution presented herein is not be limited to such applications. Furthermore, although not shown explicitly in FIG. 2, exemplary embodiments may include other features that will be introduced below in reference to FIG. 2. Before those specific features are introduced, however, a description of some of the underlying principles surrounding these further aspects is warranted.

Figure 3:
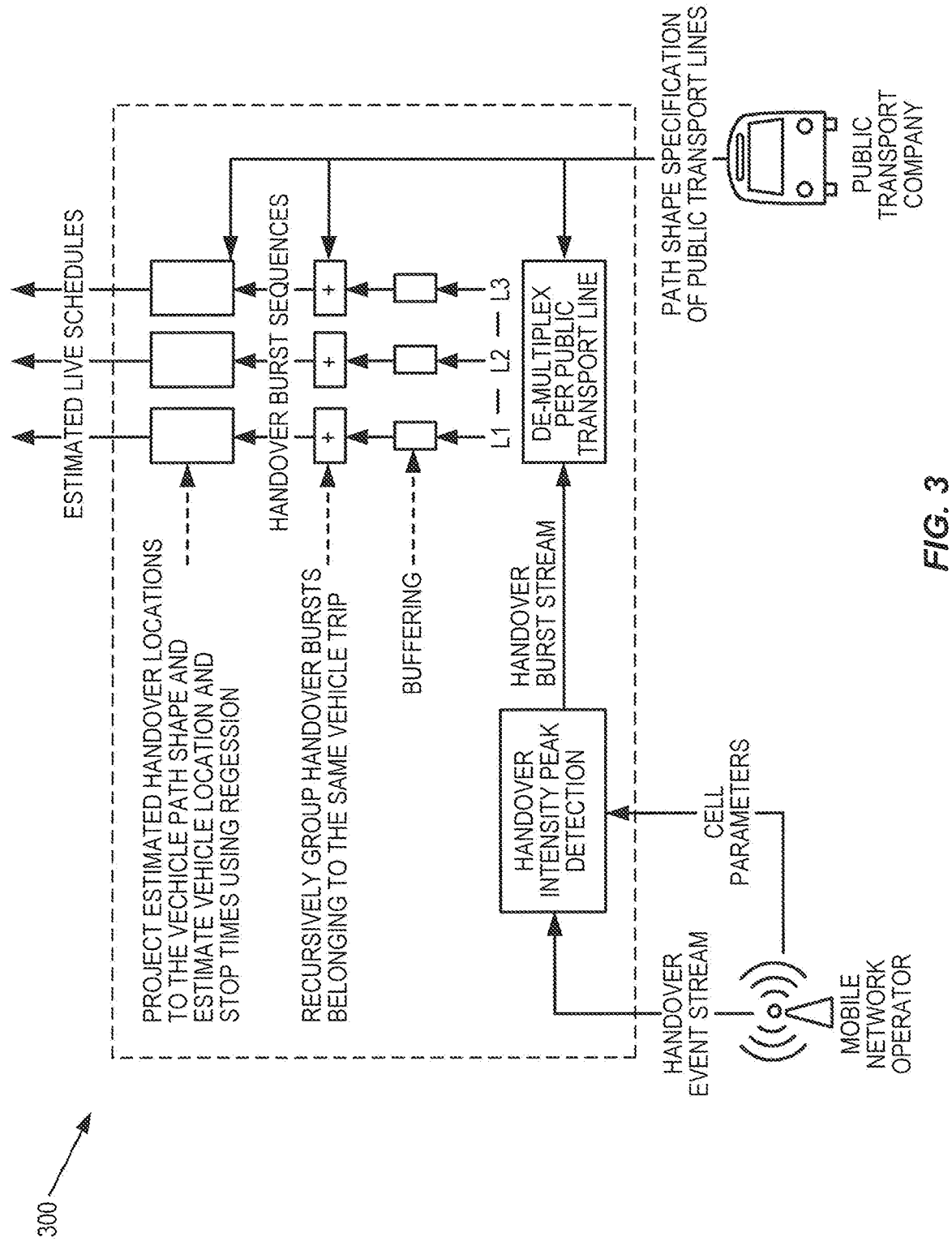
FIG. 3 shows an exemplary system-level implementation of the solution presented herein.

First, FIG. 3 shows the solution presented herein at a system level implementation. As indicated by FIG. 3, the system 300 may take, as input, mobile network cell and public transport line parameters that are specified in a well-defined format as configuration parameters. Compared to alternative and past solution requirements, the use of such mobile network cell and public transport line parameters is much cheaper and faster, i.e., instead of necessary integration of diverse IT systems. Generally, the proposed system expects the following input data sources:

- Handover event stream from the mobile network, where a handover event describes the relocation of a given mobile user from a source cell to a target cell; and
- Cell configuration and cell planning data from the mobile network that can be used to estimate geographical location of handovers occurring between two specific cells (e.g., cell identifiers, latitude and longitude of cell towers, beam direction, etc.); and
- Description of path shape specification and stop locations for public transport lines for which schedules are to be estimated.

Possessing this data allows handover events and bursts thereof to be tracked, located, and mapped onto approximate geographical locations along a vehicle route. The handover event data can be made available as a real-time data stream from mobile network and service providers, while cell parameters and public transport line shape and stop data are more static configuration information.

In one exemplary embodiment, a "handover intensity peak detection module" processes the incoming handover event stream first, as shown in FIG. 3. The handover intensity peak detection module analyzes handover event intensity time series separately for each handover relation (which, for the purposes of the present disclosure, is a relation between the source and target/destination cells, generally referred to herein as a "cell pair") and identifies peaks exceeding significantly average handover event intensity. Along a high traffic public transport line, these high intensity handover event bursts are usually related to a large number of people traveling on the same vehicle and performing handovers roughly at the same time as the vehicle moves through the overlap of the coverage provided by a cell pair.

In some instances, the following parameters are reported by the handover intensity peak detection module for each identified handover burst:

Timestamp (median or average of individual handover timestamps in the burst);

Source cell ID;

Target cell ID;

Handover location estimated from cell parameters and planning info: latitude, longitude, accuracy; and Set of anonymized user IDs performing handover during this burst (note: any anonymization should be consistent, i.e., the same user ID should be mapped to the same anonymized ID in subsequent bursts).

Figure 4:
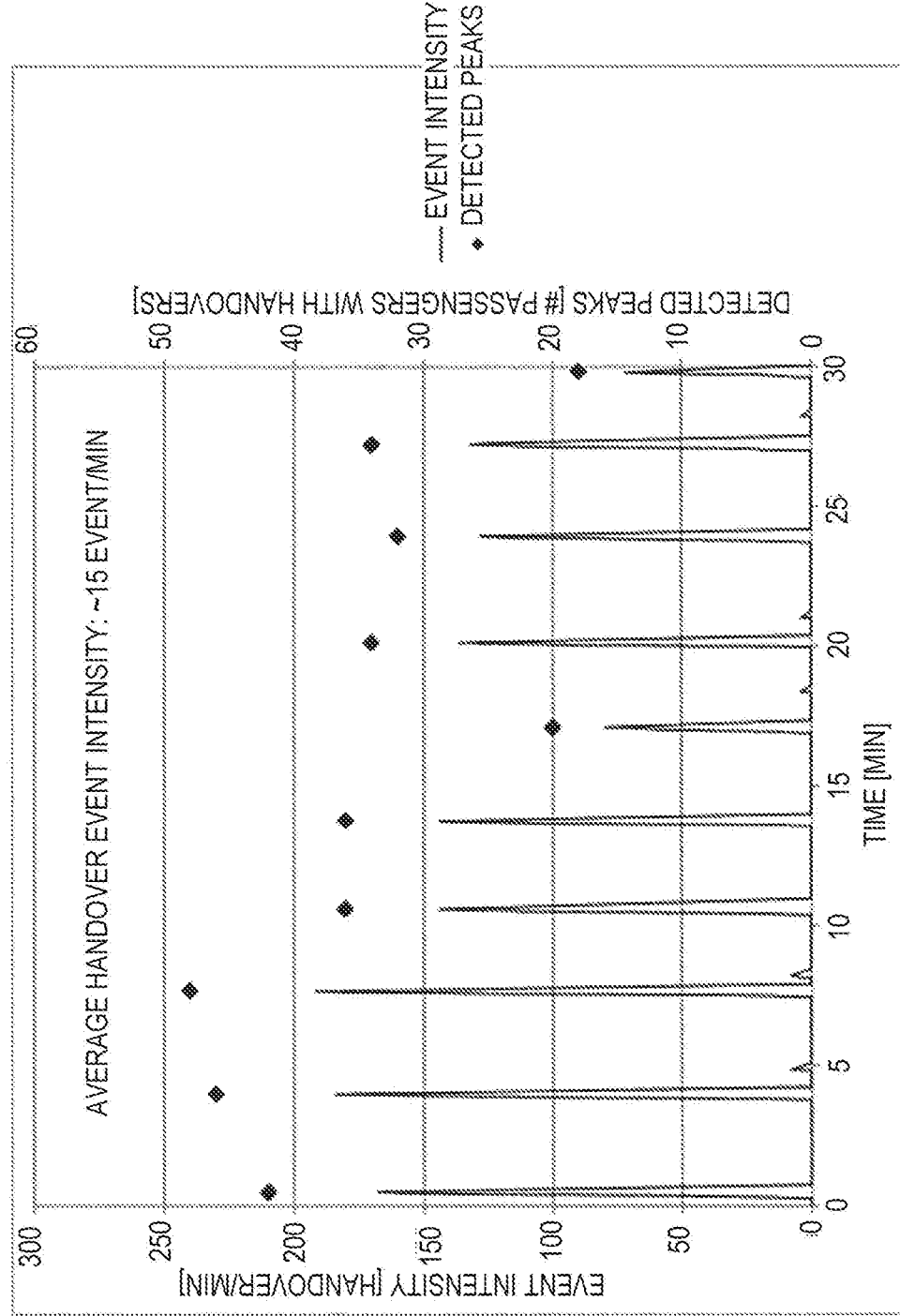
FIG. 4 shows an exemplary graph of handover event intensity time series and estimated handover bursts for mobile cells in underground tunnels.
Figure 5:
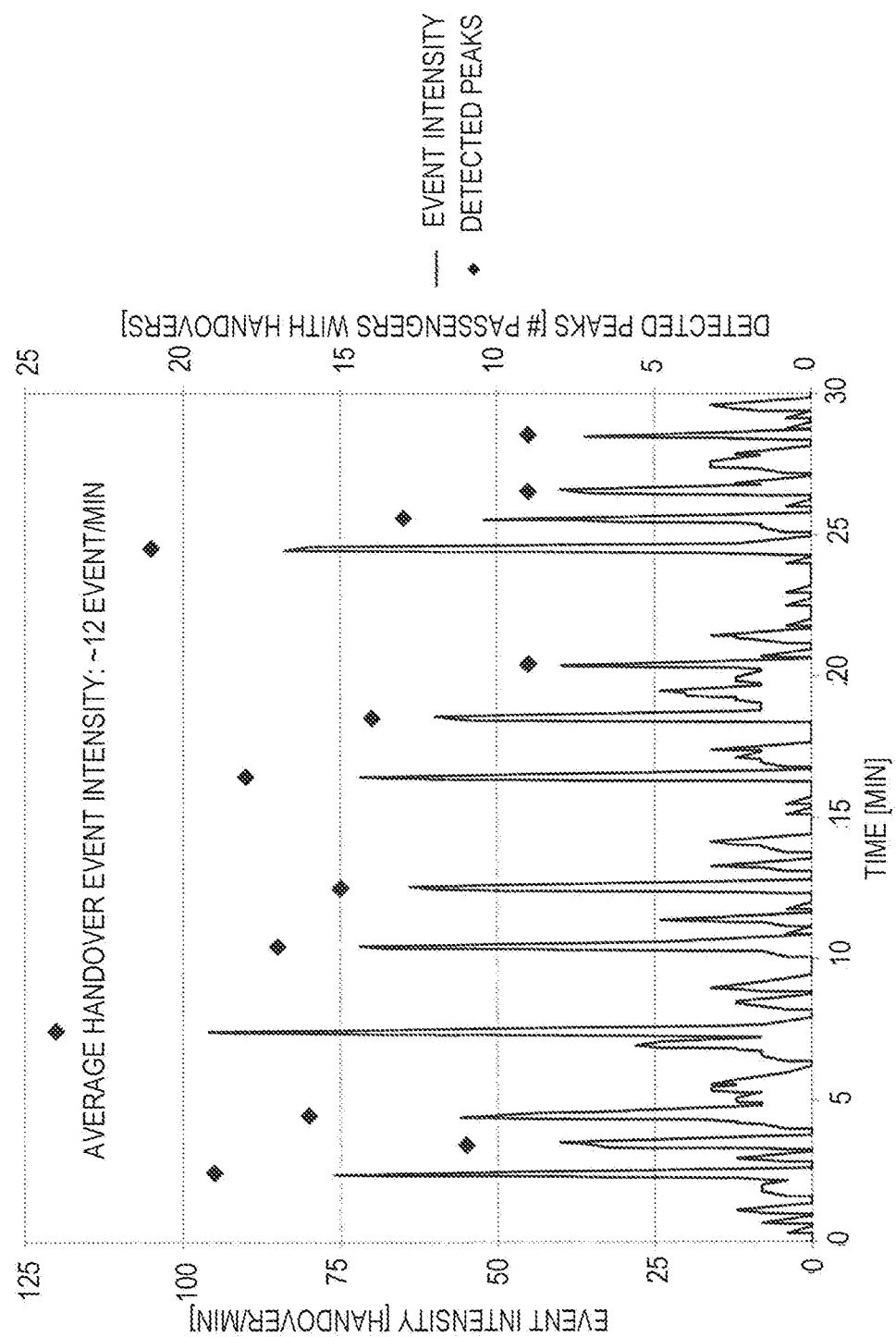
FIG. 5 shows an exemplary graph of handover event intensity time series and estimated handover bursts for above-ground mobile cells.

FIGS. 4 and 5 show exemplary handover event intensity time series and handover burst estimation results. In particular, FIG. 4 shows a graph of handover event intensity and estimated handover bursts over time (here, using a 15-second sliding time window) for a particular location having dedicated mobile cells located in underground tunnels along the route (for example, one specific metro cell pair along metro line M3 in Budapest). As shown by FIG. 4, for underground lines in a tunnel having dedicated mobile cells in the tunnel, peaks (or "bursts") in handover occurrence are relatively easy to identify and are clearly related to a vehicle (e.g., a metro train) passing between two stations. As exemplified in a similar graph for an above-ground line in FIG. 5, handover event intensity profiles are usually much more "noisy" than their underground counterparts due to pedestrians, people in cars, etc. However, for high traffic public transport lines where public transport throughput significantly exceeds non-public transport throughput, these peaks can still be detected reliably in most cases, as shown in FIG. 5.

Figure 6A:
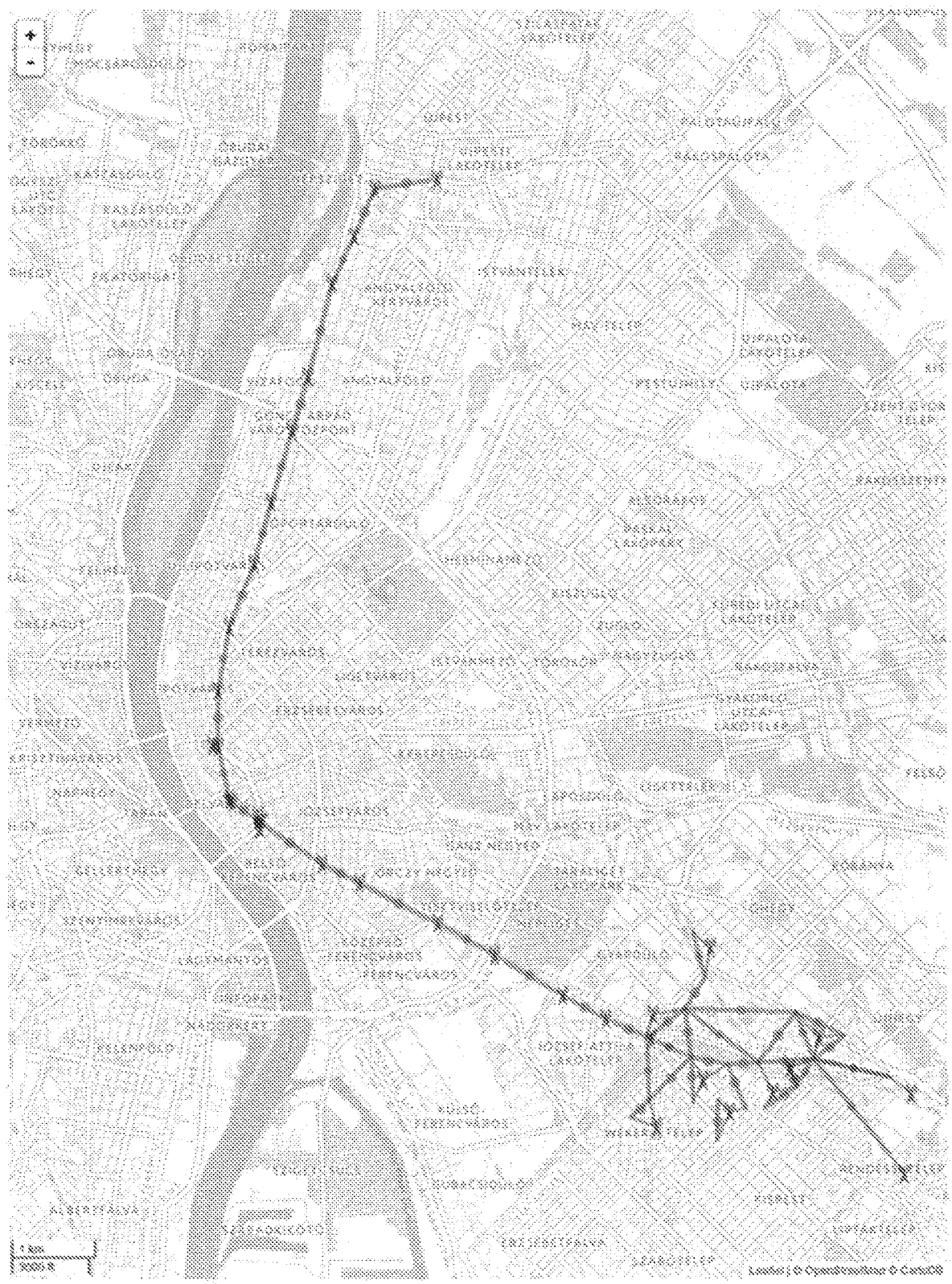
FIGS. 6A-6B show exemplary routes and the corresponding handover relations.
Figure 6B:
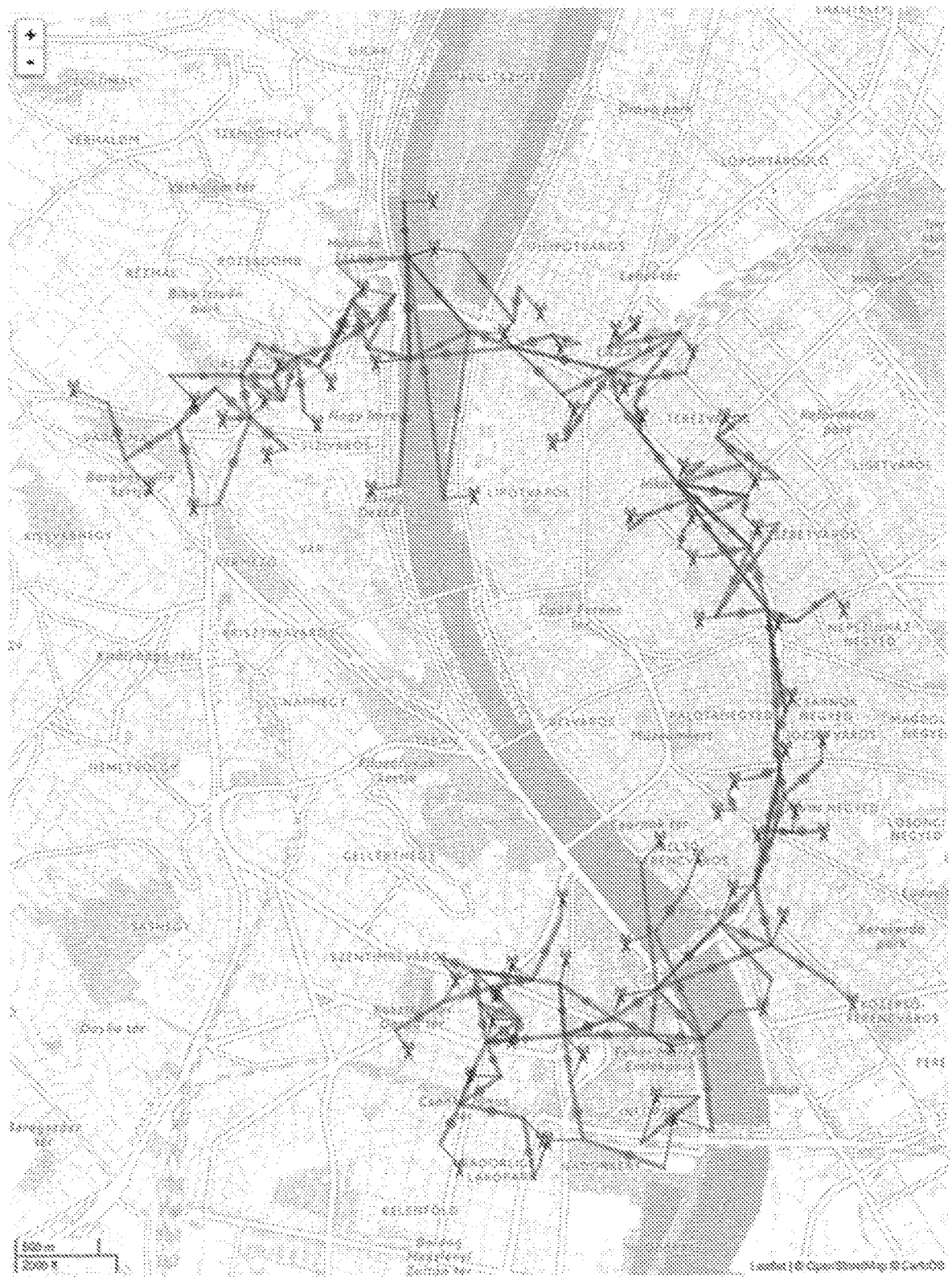

Returning to FIG. 3, estimated handover bursts are sent to a de-multiplexer module. The de-multiplexer module has separate outputs for each public transport line and direction combination to be analyzed (e.g., L1, L2, and L3 for the example show in FIG. 3). Each output channel sends bursts for all handover relations that can happen with non-negligible probability along the specific public transport line. FIGS. 6A and 6B show handover relations to be analyzed along two particular vehicle paths in Budapest: metro line M3 (FIG. 6A) and Tram line 4-6 (FIG. 6B). In these figures, the dots denote estimated handover locations between cells, while the lines link estimated cell coverage area centers. FIGS. 6A and 6B show that above-ground segments (see e.g., the southernmost part of line M3 and the entire Tram 4-6 line) already have many different handover options, and different users might be performing different handover sequences along the same vehicle path.

Returning to FIG. 3, using these de-multiplexed handover burst streams, separate handover burst modules are run in parallel for each vehicle route and/or public transport line to identify handover bursts belonging to the movement of one specific vehicle trip. For each vehicle traversing a particular route, riders will come aboard and dismount at every stop, though there almost always exists some overlap between passengers over different segments of the same vehicle path. In other words, typically at least one rider stays on a vehicle through a stop. Therefore, handover bursts belonging to the same vehicle trip can be connected or "chained" by searching for overlaps in the user identifier set of subsequent bursts.

Table 1 demonstrates an example of this chaining method for assembling a vehicle's route and timing information using recursive application of certain methods. For each public transport line and direction combination analyzed, one specific handover relation (source and destination cell pair) is selected as a start handover relation (cell ID 560708→cell ID 559681 in the example of Table 1). This is preferably chosen as a dominant handover relation along the busiest segment of the given line (i.e., most passengers with active radio connections perform handover between these two specific cells). Each handover burst for this start handover relation is considered as a starting point to recursively find the handover sequence for a given vehicle trip segment, both before and after handover in time.

TABLE 1

Find trip for start handover at 2017 Aug. 9 16:00:42 along line M3, direction: Kőbánya Kispest Add start ho burst 560708 -> 559681 (2017 Aug. 9 16:00:42,22 passengers)
Add ho burst 559681 -> 559682 (+1.6 min, 7 passengers) with 5 common passengers (71%)
Add ho burst 560963 -> 560708 (−1.6 min, 15 passengers) with 5 common passengers (33%)
Add ho burst 560707 -> 560963 (−3.1 min, 10 passengers) with 7 common passengers (70%)
Add ho burst 559685 -> 559686 (+8.4 min, 16 passengers) with 4 common passengers (25%)
Add ho burst 560450 -> 560194 (+16.2 min, 19 passengers) with 6 common passengers (31%)
Add ho burst 560195 -> 560450 (+14.6 min, 24 passengers) with 16 common passengers (66%)
Add ho burst 560196 -> 560451 (+11.5 min, 30 passengers) with 15 common passengers (50%)
Add ho burst 560451 -> 560195 (+12.8 min, 17 passengers) with 17 common passengers (100%)
Add ho burst 560194 -> 560449 (+17.8 min, 17 passengers) with 13 common passengers (76%)
Add ho burst 560449 -> 560193 (+19.1 min, 13 passengers) with 12 common passengers (92%)
Add ho burst 560193 -> 165379 (+20.6 min, 12 passengers) with 11 common passengers (91%)
Add ho burst 559686 -> 560196 (+10.1 min, 19 passengers) with 10 common passengers (52%)
Add ho burst 365379 -> 196001 (+20.9 min, 10 passengers) with 9 common passengers (90%)
Add ho burst 559684 -> 559685 (+6.8 min, 16 passengers) with 9 common passengers (56%)
Add ho burst 196001 -> 365891 (+21.5 min, 24 passengers) with 8 common passengers (33%)
Add ho burst 559682 -> 559683 (+3.3 min, 10 passengers) with 6 common passengers (60%)
Add ho burst 826947 -> 826946 (+22.3 min, 8 passengers) with 5 common passengers (62%)
Add ho burst 559683 -> 559684 (+5.4 min, 6 passengers) with 5 common passengers (83%)
Add ho burst 365891 -> 826946 (+21.7 min, 6 passengers) with 4 common passengers (66%)
Add ho burst 560706 -> 560962 (−6.2 min, 5 passengers) with 4 common passengers (80%)
Add ho burst 560961 -> 560706 (−6.8 min, 6 passengers) with 4 common passengers (66%)
Add ho burst 365891 -> 826947 (+21.9 min, 4 passengers) with 3 common passengers (75%)
Add ho burst 365891 -> 365377 (+21.8 min, 3 passengers) with 3 common passengers (100%)
Add ho burst 560193 -> 196002 (+21.0 min, 4 passengers) with 3 common passengers (75%)
Add ho burst 560962 -> 560707 (−4.6 min, 5 passengers) with 3 common passengers (60%)
Add ho burst 560705 -> 560961 (−8.2 min, 3 passengers) with 3 common passengers (100%)
Add ho burst 365377 -> 196001 (+21.2 min, 2 passengers) with 2 common passengers (100%)

Figure 7:
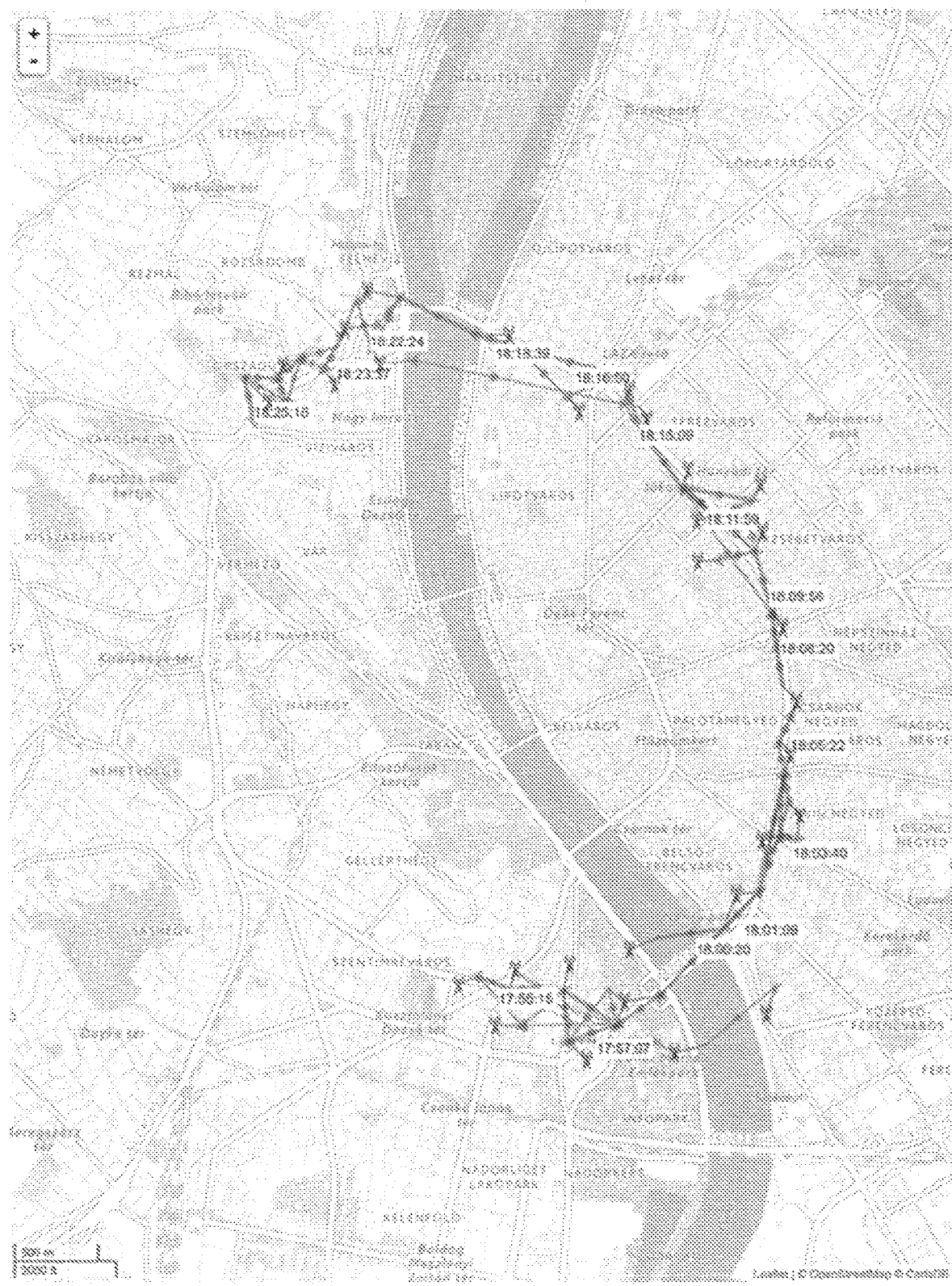
FIG. 7 shows an exemplary result for the recursive process of Table 1.

FIG. 7 demonstrates an exemplary result of the above recursive process for tram line 4-6 in Budapest, where the map displays all the handover bursts that had been selected for a given trip of a given vehicle on that line.

The following guiding principles may be used to ensure that unrelated handover bursts are not chained (e.g., due to a group of people getting off at one stop and boarding some time later a next vehicle on the same line):

Prioritize adding handover bursts with the largest number of users (passengers) also found in already added handover bursts. This ensures adding the most reliable bursts first.

Note: looking at the example in Table 1, this "common passengers" number starts increasing after having added the first few handover bursts. This is because handovers occur only when a mobile phone is active and looking at multiple bursts at different time periods, the probability of having a burst where a given passenger's phone is active again is increasing.

A new handover burst is added to the chain only if a number of constraints are also satisfied, e.g.:

The new burst fits into the monotone linear progress of already added bursts along the public transport path. In other words, one should not add a new handover—despite the matching user identifiers—if it would result in a significant backward or forward jump. This can be checked with, e.g., linear regression.

Other bursts from the same handover relation (or its reverse relation) had not yet been added before to the trip. Previously added bursts must have been more reliable due to the above prioritization.

Figure 8:
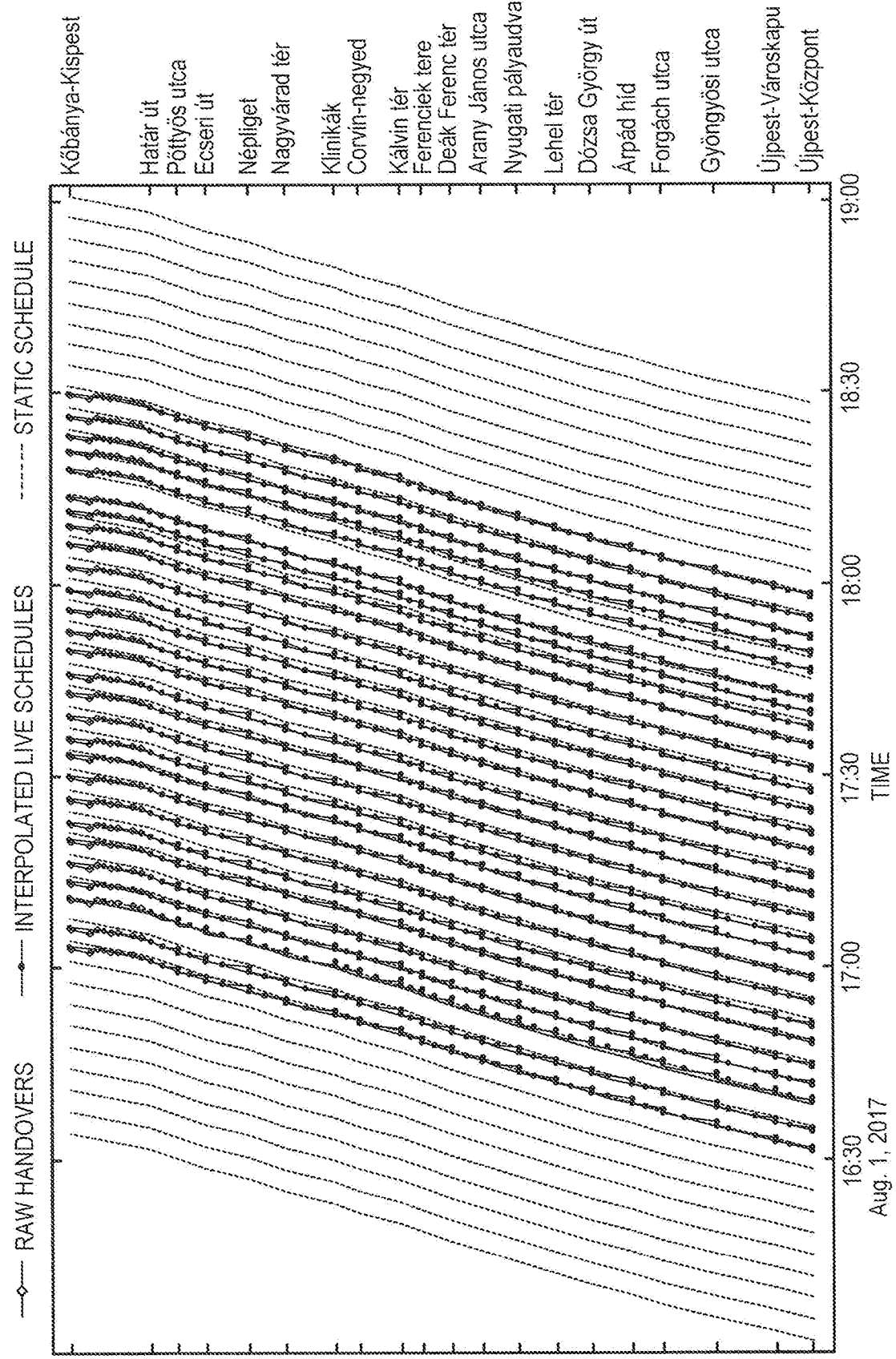
FIG. 8 shows exemplary schedules resulting from one exemplary embodiment.

To enable this two-way matching process, handover bursts along a given public transport line are buffered in a first-in, first-out (FIFO) queue for a time period slightly longer than typical total travel time between terminal stations. Optionally, schedule estimation latency and buffer size can be reduced by using multiple start handover relations from different parts of the public transport path. Finally, projecting estimated handover locations in the resulting handover burst sequence to the vehicle path shape, vehicle location and stop times can be estimated using regression methods. FIG. 8 shows exemplary schedules (solid lines with circles) resulting from such a regression method, where estimated schedules are compared against offline timetables for metro line M3 in Budapest, where the dotted lines denote offline schedules while the solid lines with dots shows actual vehicle location as estimated from handover bursts.

With this overview of the solution presented herein, let us now return to the discussion of the method of FIG. 2 to further describe alternative and additional aspects. For example, obtaining the cell handover information may include receiving a handover event stream from each of the one or more network or service providers. For example, if multiple network or service providers are utilized by particular subsets of the subscriber telecommunications devices, then each of the multiple network or service providers may provide an output stream of handovers and/or handover burst data in a handover event stream to the device. As outlined above, the handover event stream may indicate handover of one or more of the multiple subscriber telecommunications devices from a source cell to a target cell.

In addition, in some exemplary embodiments, obtaining the cell handover information may comprise obtaining cell topology data from the one or more network or service providers. Such cell topology data allows the system (e.g., via one or more devices, including device 700 of FIG. 9 or FIG. 10, processing units, modules, components, software function running on one or more devices, etc. associated with the system) to determine geographic data corresponding to cells of the one or more network providers, which may be utilized to geographically pinpoint to some degree the occurrence of a handover burst in the handover event stream. Therefore, ultimately, the obtained cell topology data is also used to generate the schedule information in some instances. Furthermore, the cell topology data can include one or more of cell identifiers, latitude and/or longitude data, and/or beam directions.

Additionally, exemplary embodiments may further comprise obtaining geographical route information corresponding to currently implemented or planned vehicle routes for the one or more vehicles. Obtaining such geographical information allows the system generating schedule information to map handover burst events and times to actual locations along a vehicle route. In one exemplary embodiment, the geographical route information may include path shape specifications and/or stop locations for the vehicle routes. In some examples, generating the schedule information is further based on the obtained geographical route information.

In another embodiment, a handover burst can be consistently identified by determining a number of cell handovers, as indicated by the obtained cell handover information, for each of multiple cell handover possibilities. Moreover, to constitute a burst, the cell handovers should occur within a particular time window defining a reasonable burst duration given a speed of the vehicle at handover time. In addition, based on the determination, the device can identify one or more handover bursts for each of the multiple cell handover possibilities, e.g., by utilizing time series analysis on the number of cell handovers for each of the multiple cell handover possibilities.

In addition, exemplary methods may include generating, for each of the one or more handover bursts, one or more of a timestamp, a source cell identifier, a target cell identifier, an estimated handover location, and a set of anonymized identifiers corresponding to each of the multiple subscriber telecommunications devices that were handed over during the handover bursts. In addition, to delineate the vehicle routes for proper analysis, the method may include selecting multiple handover cell relations that meet an occurrence probability condition for each of the vehicle routes. Upon selection of these cell relations that make sense for a route, the handover bursts may be analyzed for each of the selected cell handover relations along each of the vehicle routes in order to generate the schedule information.

Furthermore, as discussed above, analyzing handover bursts for the selected multiple cell handover relations comprises forming a chain of multiple handover bursts out of the selected one or more handover bursts to trace movement of a vehicle over the one or more vehicle routes. In some examples, forming the chain of multiple handover bursts comprises selecting a starting handover cell relation (or multiple) corresponding to the source cell and the target cell of a handover burst having a greatest number of the multiple subscriber telecommunications devices being handed over from the source cell to the target cell during the handover burst. This rule can help ensure that the most likely burst is selected for each additional burst added to the route chain.

In a further embodiment, forming the chain may include selecting a next handover burst in the chain from remaining unselected handover bursts that has a highest number of subscriber telecommunications devices being handed over in common with previously added handover bursts in the chain and that fits a monotone linear progression of existing handover bursts in the chain. Moreover, selecting the next handover burst in the chain may include selecting from remaining unselected handover bursts within a sliding time window.

In a further rule, some embodiments may include selecting a next handover burst that corresponds to a handover cell relation between a source cell and a target cell for which a corresponding handover burst has not been previously added to the chain. Also, as outlined above, forming the chain of multiple handover bursts may be performed recursively in order to generate the schedule information.

In addition, the method of the solution presented herein may comprise projecting estimated handover locations associated with the handover bursts forming the chain to a path of a known vehicle route and estimating vehicle location and stop times as the schedule information. Once the schedule information is generated, the device can send the generated schedule information to one or more external devices.

Note that the apparatuses described above may perform the methods herein and any other processing by implementing any functional means, modules, units, or circuitry. In one embodiment, for example, the apparatuses comprise respective circuits or circuitry configured to perform the method steps shown in the method figures and/or described herein. The circuits or circuitry in this regard may comprise circuits dedicated to performing certain functional processing and/or one or more microprocessors in conjunction with memory. For example, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols, as well as instructions for carrying out one or more of the techniques described herein. In embodiments that employ memory, the memory stores program code that, when executed by the one or more processors, carries out the solution(s) presented herein.

Figure 9:
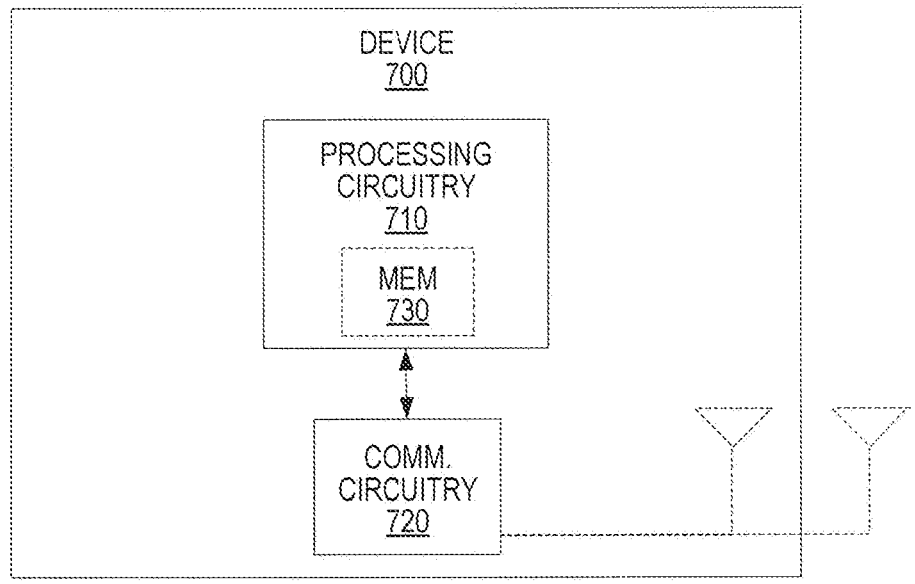
FIG. 9 shows an exemplary device for implementing the solution presented herein.

FIG. 9 illustrates an exemplary device 700 as implemented in accordance with one or more embodiments. As shown, device 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, such as by executing instructions stored in memory 730. The processing circuitry 710 in this regard may implement certain functional means, units, or modules.

Figure 10:
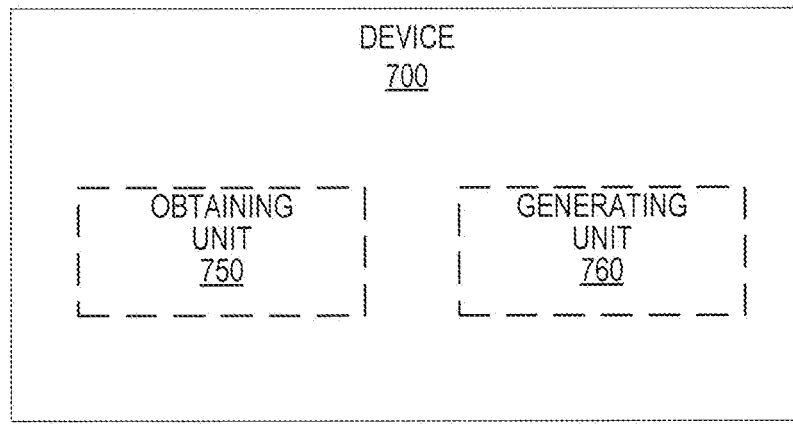
FIG. 10 shows another exemplary device for implementing the solution presented herein.

FIG. 10 illustrates a schematic block diagram of device 700 according to still other embodiments. As shown, the device 700 implements various functional means, units, or modules, e.g., via the processing circuitry 710 and/or via software code. These functional means, units, or modules, e.g., for implementing the method(s) disclosed herein, include obtaining unit 750 configured to obtain handover information and generating unit 760 configured to generate schedule information according to aspects of the present disclosure.

Those skilled in the art will also appreciate that embodiments disclosed herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments disclosed herein also include a computer program product stored on a non-transitory computer readable (storage or recording) medium and comprising instructions that, when executed by a processor of an apparatus, cause the apparatus to perform as described above.

Embodiments disclosed herein further include a computer program product comprising program code portions for performing the steps of any of the embodiments herein when the computer program product is executed by a computing device. This computer program product may be stored on a computer readable recording medium.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The solution presented herein may, of course, be carried out in other ways than those specifically set forth herein without departing from essential characteristics of the disclosed solution. The present embodiments are to be considered in all respects as illustrative and not restrictive, and all changes coming within the meaning and equivalency range of the appended claims are intended to be embraced therein.

What is claimed is:

1. A method, comprising:
   obtaining cell handover information for multiple subscriber telecommunications devices of one or more network or service providers;
   determining a number of cell handovers indicated by the cell handover information for each of multiple cell handover possibilities in a particular time window; and
   generating schedule information for one or more vehicles and/or vehicle routes based on the obtained cell handover information by identifying one or more handover bursts for each of the multiple cell handover possibilities by time series analysis on the number of cell handovers for each of the multiple cell handover possibilities.

2. The method of claim 1, wherein obtaining the cell handover information comprises receiving a handover event stream from each of the one or more network or service providers, the handover event stream indicating handover of one or more of the multiple subscriber telecommunications devices from a source cell to a target cell.

3. The method of claim 1, further comprising obtaining cell topology data from the one or more network or service providers from which geographic data corresponding to cells of the one or more network providers can be determined, and wherein generating the schedule information for the one or more vehicles and/or vehicle routes is further based on the obtained cell topology data.

4. The method of claim 1, further comprising obtaining geographical route information corresponding to currently implemented or planned vehicle routes for the one or more vehicles, and wherein generating the schedule information for the one or more vehicles and/or vehicle routes is further based on the obtained geographical route information.

5. The method of claim 1, wherein generating the schedule information comprises:
   selecting multiple handover cell relations that meet an occurrence probability condition for each of the one or more vehicle routes; and
   analyzing the handover bursts for each of the selected cell handover relations along each of the one or more vehicle routes to generate the schedule information.

6. The method of claim 5, wherein analyzing the handover bursts for the selected multiple cell handover relations comprises forming a chain of multiple handover bursts out of the handover bursts to trace movement of a vehicle over the one or more vehicle routes.

7. The method of claim 6, wherein forming the chain of multiple handover bursts is performed recursively in order to generate the schedule information.

8. The method of claim 6, further comprising projecting estimated handover locations associated with the handover bursts forming the chain to a path of a known vehicle route and estimating vehicle location and stop times as the schedule information.

9. A non-transitory computer readable medium storing a program product for controlling a device to determine scheduling information for vehicles and/or vehicle routes, the computer program product comprising software instructions which, when run on at least one processing circuit in the device, causes the at least one processing circuit to:
   obtain cell handover information for multiple subscriber telecommunications devices of one or more network or service providers;
   determine a number of cell handovers indicated by the cell handover information for each of multiple cell handover possibilities in a particular time window; and
   generate schedule information for one or more vehicles and/or vehicle routes based on the obtained cell handover information by identifying one or more handover bursts for each of the multiple cell handover possibilities by time series analysis on the number of cell handovers for each of the multiple cell handover possibilities.

10. A device configured to determined scheduling information for vehicles and/or vehicle routes, the device comprising:
    an obtaining circuit configured to obtain cell handover information for multiple subscriber telecommunications devices of one or more network or service providers; and
    a generating circuit configured to:
       determine a number of cell handovers indicated by the cell handover information for each of multiple cell handover possibilities in a particular time window; and
       generate schedule information for one or more vehicles and/or vehicle routes based on the obtained cell handover information by identifying one or more handover bursts for each of the multiple cell handover possibilities by time series analysis on the number of cell handovers for each of the multiple cell handover possibilities.

11. The device of claim 10, wherein the obtaining circuit obtains the cell handover information by receiving a handover event stream from each of the one or more network or service providers, the handover event stream indicating handover of one or more of the multiple subscriber telecommunications devices from a source cell to a target cell.

12. The device of claim 10, wherein:
    the obtaining circuit is further configured to obtain cell topology data from the one or more network or service providers from which geographic data corresponding to cells of the one or more network providers can be determined; and
    the generating circuit is configured to generate the schedule information for the one or more vehicles and/or vehicle routes based on the obtained cell handover information and the obtained cell topology data.

13. The device of claim 10, wherein:
    the obtaining circuit is further configured to obtain geographical route information corresponding to currently implemented or planned vehicle routes for the one or more vehicles; and the generating circuit is configured to generate the schedule information for the one or more vehicles and/or vehicle routes based on the obtained cell handover information and the obtained geographical route information.

14. The device of claim 10, wherein the generating circuit is configured to generate the schedule information by:
   selecting multiple handover cell relations that meet an occurrence probability condition for each of the one or more vehicle routes; and
   analyzing the handover bursts for each of the selected cell handover relations along each of the one or more vehicle routes to generate the schedule information.

15. The device of claim 14, wherein the generating circuit analyzes the handover bursts for the selected multiple cell handover relations by forming a chain of multiple handover bursts out of the handover bursts to trace movement of a vehicle over the one or more vehicle routes.

16. The device of claim 15, wherein the generating circuit is configured to recursively form the chain of multiple handover bursts in order to generate the schedule information.

17. The device of claim 15, wherein the generating circuit is further configured to project estimated handover locations associated with the handover bursts forming the chain to a path of a known vehicle route and estimating vehicle location and stop times as the schedule information.

18. The device of claim 10, further comprising communication circuitry configured to send the generated schedule information to one or more external devices.

* * * * *